United States Patent [19]

Henke

[11] 4,373,845
[45] Feb. 15, 1983

[54] ANIMAL FEED TRANSPORT AND SELF-UNLOADING VEHICLE

[75] Inventor: Donald L. Henke, Maple Plain, Minn.

[73] Assignee: Veda, Inc., Long Lake, Minn.

[21] Appl. No.: 222,963

[22] Filed: Jan. 7, 1981

Related U.S. Application Data

[63] Continuation-in-part of Ser. No. 955,971, Oct. 30, 1978, abandoned.

[51] Int. Cl.³ .................................................. B60P 1/42
[52] U.S. Cl. .................................. 414/326; 198/671; 414/526
[58] Field of Search ............... 414/502, 526, 507, 304, 414/325, 326; 366/603, 186, 297, 319, 325; 198/616, 558, 671, 664, 665, 657; 239/675, 680; 222/412, 413

[56] References Cited

U.S. PATENT DOCUMENTS

| 376,552 | 1/1888 | Rossler | 98/664 |
|---|---|---|---|
| 3,090,605 | 5/1963 | Copeland et al. | 259/104 |
| 3,421,740 | 1/1969 | Behrens | 259/41 |
| 3,672,640 | 6/1972 | Crose | 259/6 |
| 3,706,442 | 12/1972 | Peat | 259/41 |
| 3,712,494 | 1/1973 | Lindeborg | 198/657 X |
| 3,797,807 | 3/1974 | Behrens | 259/41 |
| 3,995,836 | 12/1976 | Carter et al. | 259/6 |

FOREIGN PATENT DOCUMENTS

618205  2/1949  United Kingdom ..................... 6/5

OTHER PUBLICATIONS

*Rapid Transit*, Model F130, Feeder Wagon, Van Dale, Form No. 1-1411.
*Lo-Profile 1830 Ensilmixer*, Oswalt Division, Butler Manufacturing Company, Form No. 887-3M-12-76.
*850 Mixer-Feeder*, E. R. Schwartz.
*BJM Mixer Feeder*, BJ Manufacturing Co., Inc.
*Feed Easy Dependable Mixer/Feeder Systems*, Fleming Manufacturing Co., Form No. 1-1389-42.
*Mixer/Feeder*, Van Dale, Form No. 1-1389.

*Primary Examiner*—Robert G. Sheridan
*Attorney, Agent, or Firm*—Burd, Bartz & Gutenkauf

[57] ABSTRACT

A material transport and self-unloading vehicle having an open top hopper for accommodating bulk material, as animal feeds. A first material conveying auger is located along the bottom of the hopper for moving material toward a side discharge opening in the hopper. A second paddle auger is located above the first auger for moving material rearwardly in the hopper. A side unloading conveyor mounted on the side of the hopper adjacent the side discharge opening operates to receive material moved through the discharge opening by the first auger and move the material laterally of the hopper to a discharge or feeding location. A drive assembly drivably connects a power take-off drive shaft to the first and second augers and unloading conveyor for concurrent operation of the augers and unloading conveyor. The bottom wall of the hopper has a curved section extended contiguously around the leading section of the flights of the first auger and a linear bend or break line located adjacent the leading side of the first auger in a horizontal plane that generally intersects the axis of rotation of the first auger.

3 Claims, 6 Drawing Figures

ANIMAL FEED TRANSPORT AND SELF-UNLOADING VEHICLE

CROSS REFERENCE TO RELATED APPLICATION:

This application is a continuation-in-part of U.S. application Ser. No. 955,971, filed Oct. 30, 1978, now abandoned.

SUMMARY OF INVENTION

The invention is directed to a material handling apparatus for moving and discharging material, such as animal concentrate and roughage feeds, to a desired location. The apparatus is more specifically a material transport and self-unloading vehicle having a hopper for carrying the feed. Auger means located in the hopper operate to move the feed in the hopper to a discharge opening in the side of the hopper. The auger means includes a lower auger having a helical flight located along the bottom wall of the hopper. The bottom wall has a generally semi-circular trough that extends around the leading side of the lower auger. The trough has an inside surface located close to or in contiguous relationship with the outer edge of the helical flight of the lower auger. The trough adhacent the leading side of the auger is joined with a linear break section or line to an upwardly inclined wall. The break line is generally aligned with the horizontal plane passing through the horizontal axis of the lower auger. the circumferential extent of the trough adjacent the leading side of the lower auger precludes wedging of feed between the lower auger and bottom wall of the hopper. The elimination of the wedge build-up of feed adjacent the lower auger permits the lower auger to be self-cleaning and minimizes the wrapping of feed around the lower auger.

When an auger with a helical flight is used in a conventional V-shaped trough of a feed mixing machine to move wet haylage, the haylage wedges between the bottom wall and the lower auger until either the lower auger or the bottom wall of the hopper is destroyed. The feed wedge buils up on the leading side of the lower auger and causes the auger to bend or break the auger drive chain. Also, relatively large power requirements are necessary to rotate the lower auger. The prior art solution to overcome this problem was to use relatively heavy flighting on the lower auger and reinforce the bottom wall of the hopper. This adds to the weight of the mixer and its cost. The power requirements are increased as the heavier lower auger continues to wedge feed between the auger and bottom wall of the hopper.

The trough and auger arrangement of the present invention provides a material handling machine that eliminates the wedging of feed between the lower auger and bottom wall of the hopper, and minimizes the winding and wrapping of feed, as wet haylage, around the lower auger. The bending of the lower auger and auger drive chain breakage has been eliminated without the expensive reinforcement and heavier parts as required in the prior art machines. The power required to operate the augers is substantially less than the power needed to operate a similar conventional feed mixer with a V-shaped hopper.

IN THE DRAWINGS

DESCRIPTION OF PREFERRED EMBODIMENT

Figure 1:
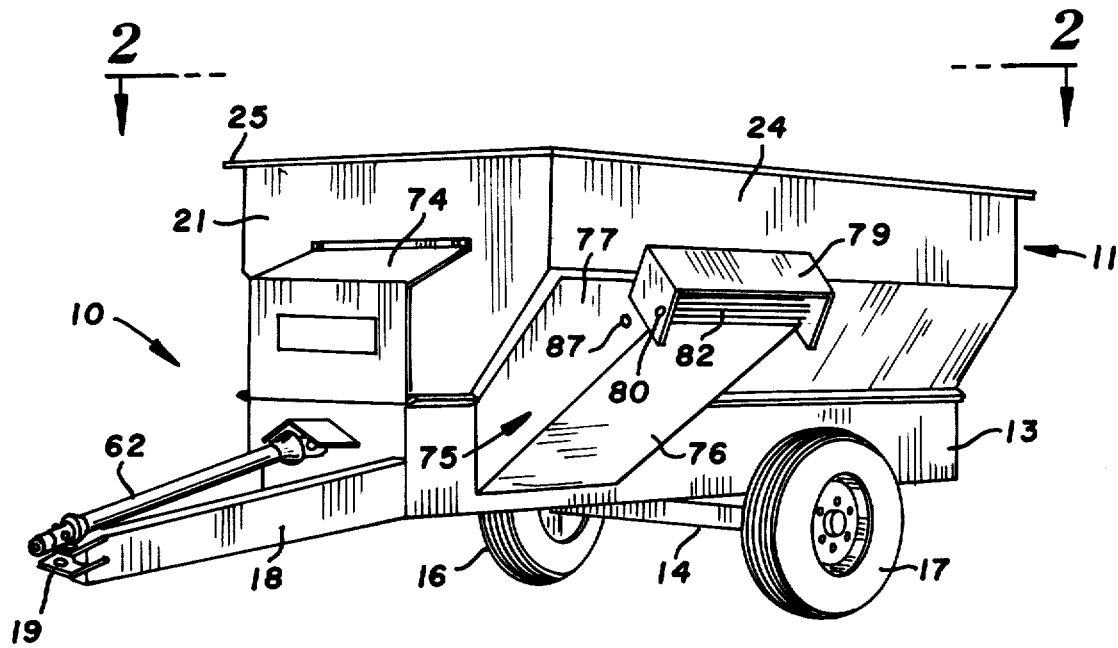
FIG. 1 is a perspective view of the feed carrying and unloading apparatus of the invention.
Figure 2:
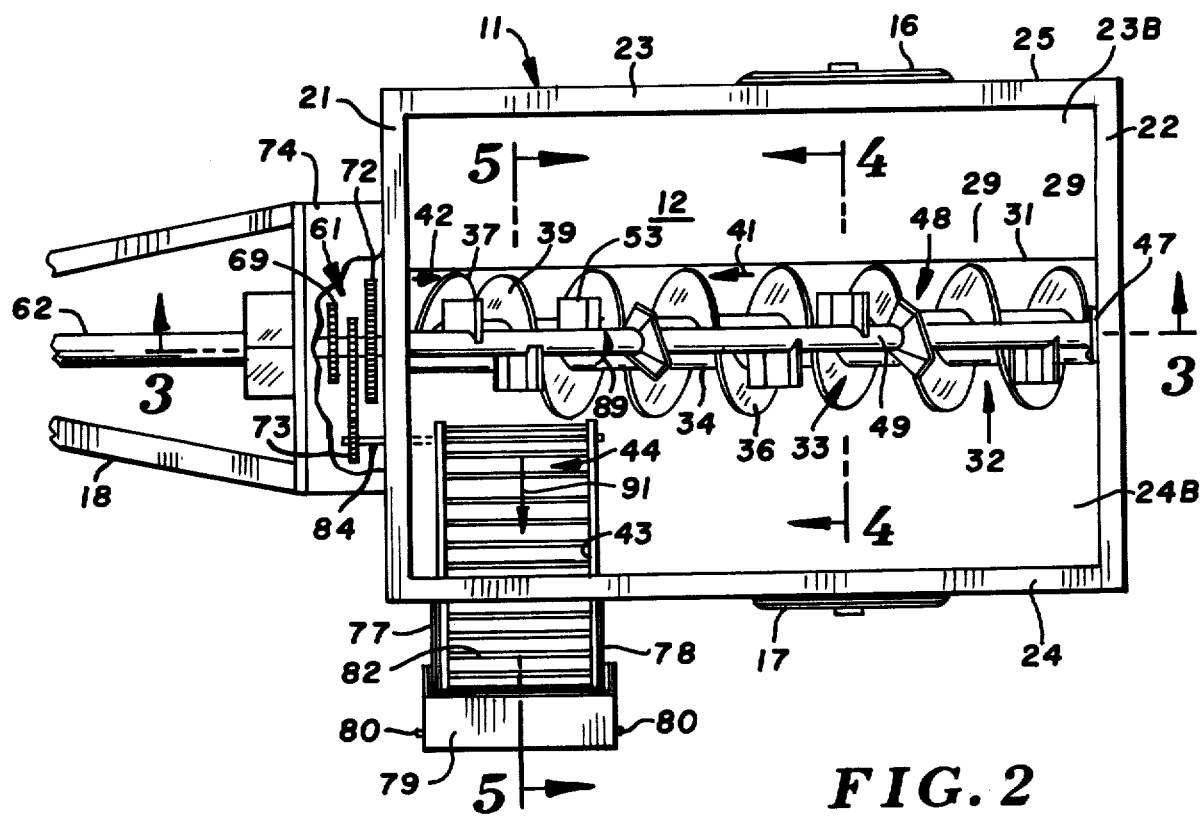
FIG. 2 is an enlarged top plan view of FIG. 1 with the tongue foreshortened.

Referring to FIGS. 1 and 2, there is shown the material handling apparatus of the invention indicated generally at 10. Apparatus 10 is a bulk particulate material carrying and unloading vehicle. The material handled by apparatus 10 includes animal feed or rations, including roughages and concentrates, as ground grain, chopped hay, haylage, silage, and a mixture of concentrates and roughages. Other types of materials can be transported and unloaded with apparatus 10. The following description uses animal feed as the material handled by apparatus 10. Apparatus 10 is used to discharge the feed to a feeding location, such as a feed bunk.

Apparatus 10 has an open top box or hopper 11 providing a chamber 12 for accommodating the feed. Hopper 11 is mounted on a longitudinal frame 13. A transverse axle assembly 14 is secured to frame 13. Wheels 16 and 17 are rotatably mounted on opposite ends of axle assembly 14. A forwardly directed tongue 18 is secured to the front of frame 13. The front end of tongue 18 has a clevis tyoe hitch 19 for receiving a pin used to connect apparatus 10 to the drawbar of a draft vehicle, such as a tractor.

Figure 3:
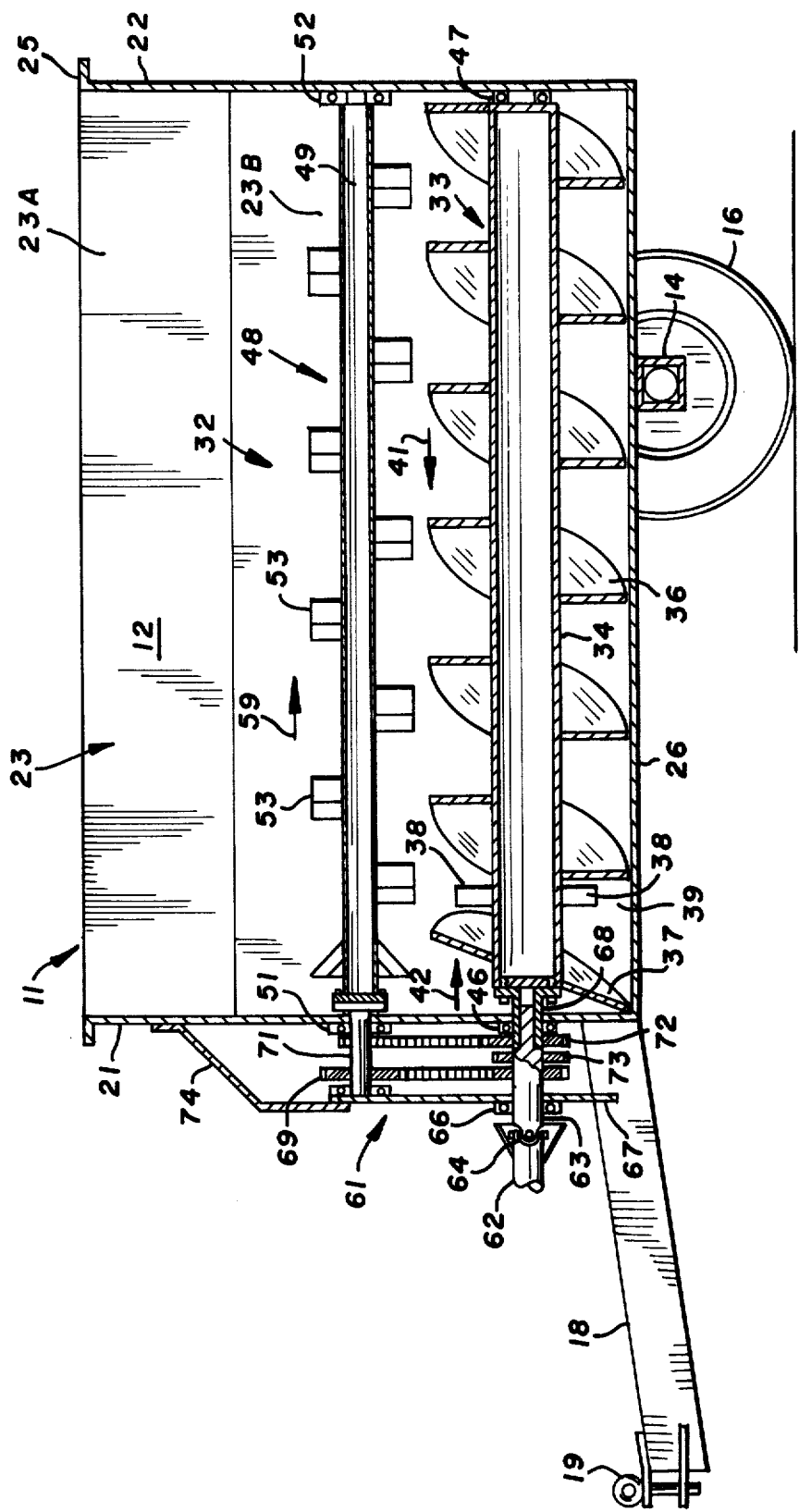
FIG. 3 is an enlarged longitudinal sectional view taken along line 3—3 of FIG. 2.
Figure 4:
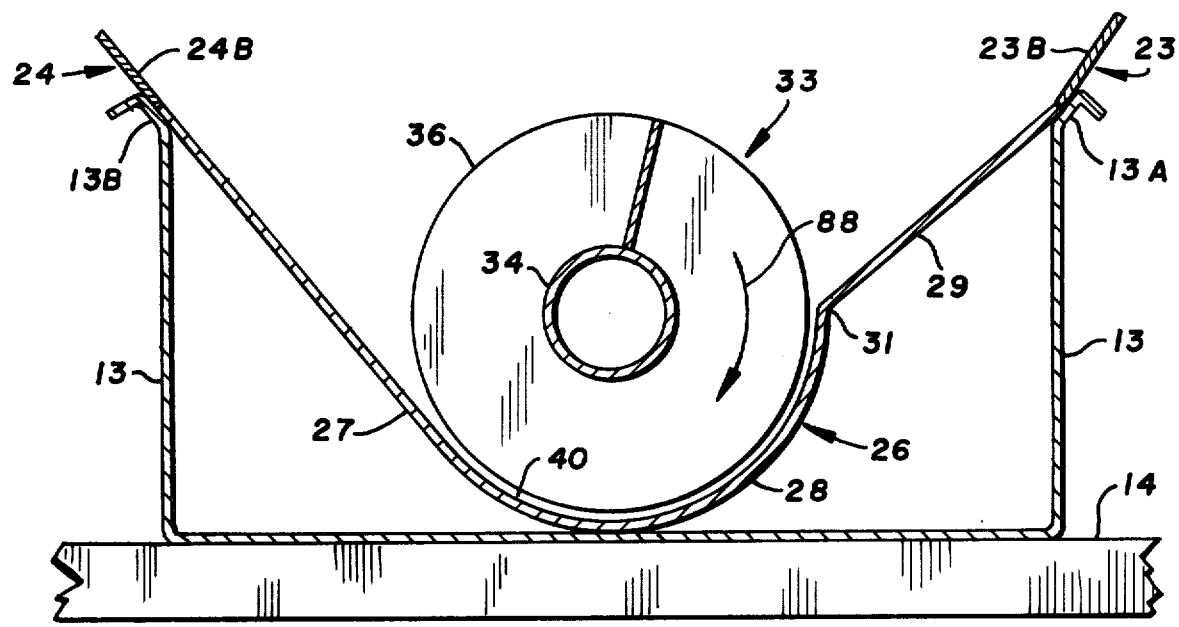
FIG. 4 is an enlarged sectional view taken along line 4—4 of FIG. 2.
Figure 5:
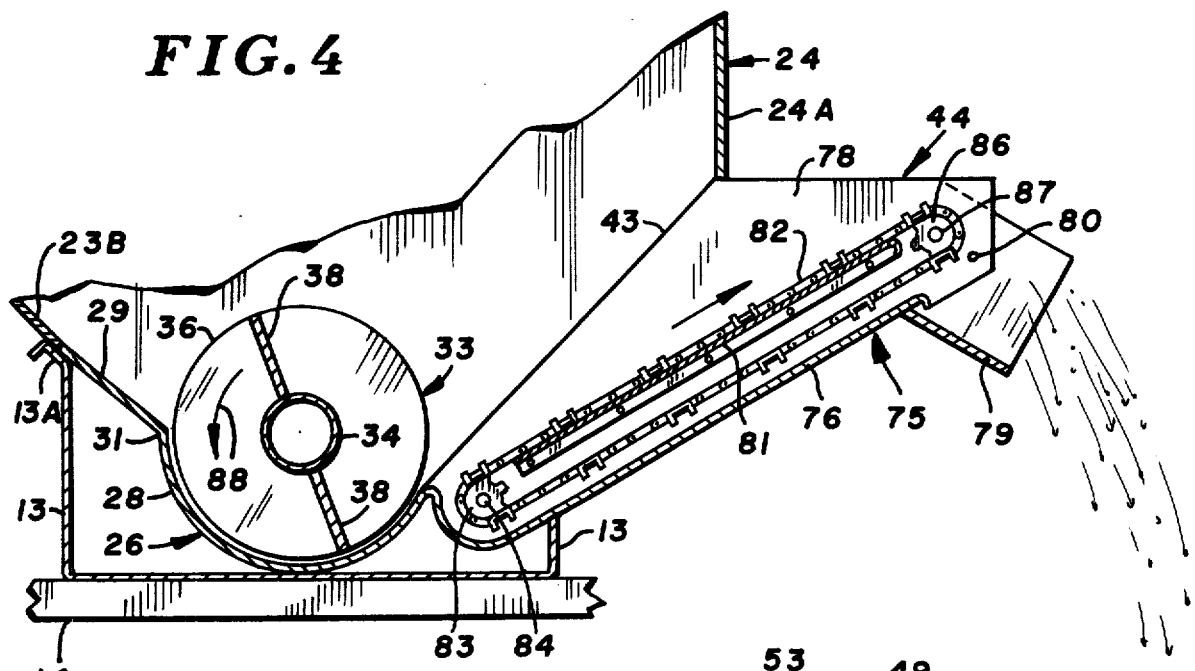
FIG. 5 is an enlarged sectional view taken along line 5—5 of FIG. 2.

Hopper 11 has an upright front end wall 21 and an upright rear end wall 22 joined to longitudinal side walls 23 and 24. End walls 21 and 22 and side walls 23 and 24 are attached to a bottom wall 26 to complete hopper 11, forming chamber 12. As shown in FIG. 3, side wall 23 has an upright flat rectangular wall 23A extended upwardly from a downwardly and inwardly inclined side wall 23B. Referring to FIG. 4, the lower edge of side wall 23B is secured to an inclined flange 13A of frame 13 adjacent the upper edge of one side of bottom wall 26. As shown in FIGS. 4 and 5, side wall 24 has a rectangular shaped flat upright wall 24A and a downwardly and inwardly inclined wall 24B. Wall 24B is secured to an inclined flange 13B of frame 13.

The upper edges of walls 21, 22, 23, and 24 have outwardly directed horizontal flanges 25. An open grid structure can extend over the open top of hopper 11. Ends of the grid structure can be attached to flanges 25. An example of the grid structure is shown in U.S. Pat. No. 3,995,836. The open grid structure of U.S. Pat. No. 3,995,836 is incorporated herein by reference.

Bottom wall 26 has an upwardly and outwardly inclined wall 27 extended to wall 24B and secured to frame flange 13B. Wall 27 is integral with an elongated trough section 28 joined to a flat upwardly and outwardly inclined wall section 29. As shown in FIG. 4, section 28 has an arcuate or semi-circular shaped cross section extending approximately 135 degrees from wall 27 to a longitudinal ridge, bend or break section, or break line 31. Section 31 is the apex of an obtuse angle of approximately 135 degrees between the right side of trough section 28 and the flat inclined wall section 29.

As shown in FIGS. 2, 3, 4, and 5, a material conveying means indicated generally at 32 extends between end walls 21 and 22 in chamber 12. Material conveying means 32 operates to uniformly deliver feed to an out conveyor indicated generally at 44 which moves the feed to a discharge location, such as a feeding location or a feed bunk. Conveying means 32 has a first auger means 33 located along the trough section 28 of bottom wall 26. First auger means 32 includes a longitudinal shaft 34 carrying a first helical flight 36 and an opposite turned or hand second helical flight 37. Helical flight 36 is a continuous spiral ribbon that extends from adjacent the inside of wall 22 toward wall 21. Helical flight 37 is a short helical flight extending from adjacent the front end wall 21 toward flight 36. Flights 36 and 37 are solid ribbon members that are secured by welds or the like to shaft 34. A plurality of radially extended paddles 38 are secured to shaft 34 in the area 39 between the adjacent ends of flights 36 and 37. As shown in FIG. 4, helical flight 36 has a circular outside edge that is located in a contiguous relationship with respect to the inside circular surface of trough section 28 of bottom wall 26. Trough section 28 is located radially outward by a small and uniform arcuate space 40 from the outer peripheral edge of flight 36. Flight 37 has similar spaced relationship with respect to the trough section 28. Section 31 extends the length of auger means 33 and is located in a horizontal plane that intersects the longitudinal or rotational axis of auger shaft 34. Section 31 is located adjacent the leading side of helical flights 36 and 37. The trough section 28 is located adjacent the second and third quadrants starting from the top of auger means 33 and extending clockwise, as shown in FIG. 4. Section 31 and trough section 28 of the bottom wall 26 prevent a build-up of feed or wedging of feed between trough section 28 and auger means 33 and minimize wrapping of feed, as haylage, around auger shaft 34. Enclosing the lower part of the leading side and bottom of auger means 33 prevents a wedge build-up of feed adjacent auger means 33.

A drive assembly indicated generally at 61 transmits power from a power take-off shaft 62 drivably connected to the towing vehicle to rotate auger means 33. Helical flight 36 moves the feed along trough section 28 in the direction of arrow 41. Helical flight 37 moves the feed in the trough section 28 adjacent front wall 21 in the direction of arrow 42. The feed moves to the area 39 where paddles 38 move the feed through an opening 43 in side wall 24B onto discharge conveyor 44. Shaft 34 is rotatably mounted with bearing 46 on front wall 21 and bearing 47 on rear wall 22.

Material conveying means 32 has a second auger means or a paddle auger unit indicated generally at 48 for moving the material rearwardly and eliminating the bridging of the feed in chamber 12. A second auger means 48 has a longitudinal shaft 49 located above and in general vertical alignment with shaft 34. Bearing 51 rotatably mounts the forward end of shaft 49 on front wall 21. Bearing 52 rotatably mounts the rear end of shaft 49 on rear wall 22. A plurality of feed moving paddles 53 are attached by welds or the like to shaft 49. The paddles 53 are longitudinally spaced along the length of shaft 49 in a spiral pattern. Adjacent paddles 53 are longitudinally and circumferentially spaced from each other, as shown in FIG. 3.

Figure 6:
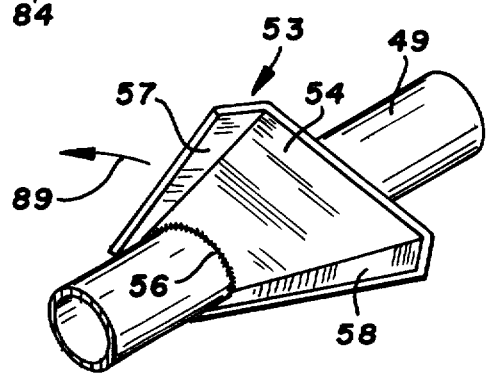
FIG. 6 is an enlarged perspective view of a portion of the upper paddle auger.

Referring to FIG. 6, paddle 53 has a generally flat body 54 that diverges in a radially outward direction. The inner edge of body 54 has a circular shaped inner edge 56 that surrounds a portion of shaft 49. Edge 56 provides an elongated circular section which facilitates the welding of paddle 53 to shaft 49. The opposite side edges of body 54 have rearwardly directed flanges 57 and 58. The inner edges of flanges 57 and 58 are secured by welds or the like to opposite portions of shaft 49. Body 54 has a front or forward surface inclined with respect to the longitudinal axis of the shaft 49. The angle between the body 54 and axis of shaft 49 can be about 110°. Other inclines or angles can be used. Drive assembly 61 functions to rotate the shaft 49 so that paddles 53 move feed from front wall 21 to rear wall 22, as shown by arrow 59 in FIG. 3.

Referring to FIG. 3, drive assembly 61 has a first shaft 63 connected to the PTO shaft 62 with a conventional universal joint 64. A bearing 66 supports shaft 63 on a support or upright plate 67 secured to tongue 18. A second tubular shaft 68 rotatably mounted on first shaft 63 is rotatably mounted on wall 21 by bearing 46. shaft 68 is secured to auger shaft 34. A first sprocket and chain drive 69 connectes shaft 63 with a shaft 71. Shaft 71 is drivably connected to auger shaft 49. A second sprocket and chain drive 72 drivably connects shaft 71 with second shaft 68 thereby rotating the first auger means 33. A third sprocket and chain drive 73 connects first shaft 63 directly to discharge conveyor 44, whereby the discharge conveyor 44 operates concurrently with the operation of the material conveying means 32. Drive assembly 61 is covered with a shield 74 connected to support 67 and front wall 21.

As shown in FIG. 5, discharge conveyor 44 has a housing indicated generally at 75 comprising a U-shaped member having a flat upwardly inclined bottom wall 76 secured to upright side walls 77 and 78. A U-shaped chute 79 is pivotally mounted on the end of side walls 77 and 78 with pivot projections 80. Chute 79 is adapted to be povoted to an outward material directing direction, as shown in FIG. 5, and in an inward covering direction, as shown in FIG. 2. A transverse upwardly inclined flat wall 81 is secured to side walls 77 and 78. Wall 81 supports the upper run of an endless chain and bar conveyor 82. The lower end of conveyor 82 is drivably located about a pair of drive sprockets 83. Sprockets 83 are secured to a transverse drive shaft 84. The third sprocket and chain drive 73 is drivably connected to shaft 84. The upper end of chain and bar conveyor 82 is trained about tail or idler sprockets 86 mounted on a transverse shaft 87. Outer ends of shaft 87 are rotatably mounted on side walls 77 and 78 with suitable bearings.

In use, bulk particulate feeds, as high roughage rations, are placed in the hopper chamber 12. The feed can be elongated stringy type haylage, chopped hay, or the like. The apparatus 10 is transported to a desired location with a towing vehicle, such as a tractor. The power take-off drive to the tractor is in neutral during the transport operation.

When the operator desires to deliver the feed to the desired location, such as a feeding area or feed bunk, the power take-off drive is operated thereby transmitting power to the drive assembly 61. The drive assembly 61 concurrently rotates the first auger means 32 in the direction of the arrow 88 and second auger means 48 in the direction of the arrow 89. Elevator conveyor 82 is moved in the direction of the arrow 91 to discharge the feed from the left front side of hopper 11. Chute 79 is pivoted to a downward direction, as shown in FIG. 5, so that it diverts the feed in an outward direction to the desired location. The material handling vehicle 10 can be moving or stationary during the time it is unloaded.

The rotating first auger menas 33 picks up the feed in the upper portion of the auger flight 36 adjacent the inclined bottom wall 29. Bend section 31 prevents a wedge build-up of the feed adjacent helical flights 36 and 37 and trough section 28. Trough section 28 being located close to the outer edges of helical flights 36 and 37 also prevents feed from wedging between bottom wall 26 and auger means 33. Auger flight 36 moves feed along trough section 28 of bottom wall 26 in the direction of arrow 41. Auger flight 37 moves the feed away from wall 21 in the direction of the arrow 42. The feed moved by flights 36 and 37 converges in area 39 between the adjacent ends of auger flights 36 and 37. Paddles 38, turning with auger shaft 49, move or throw the feed through opening 43 in the side wall 24B. Elevator conveyor 82 moves the feed up the elevator and discharges the same onto out chute 79. The feed falls off the out chute to the feeding location.

The second auger means 48 rotated by the drive assembly 61 moves the paddles 53 in a circular path. The inclined flat bodies 54 of each of the paddles moves the feed away from the front wall 21 toward the rear wall 22. Paddles 53 also prevent the feed in chamber 12 from bridging, thereby insuring a continuous and uniform supply of feed for the first auger means 33.

While there has been shown and described an embodiment of the material handling apparatus, changes in structure, materials, and size of structure can be made by one skilled in the art without departing from the invention. The invention is defined in the following claims.

The embodiments of the invention in which an exclusive property or privilege is claimed are defined as follows:

1. An animal roughage feed handling apparatus for delivering roughage feed to a selected location comprising: a hopper having a first upper side wall, a second upper side wall, a bottom wall, and end walls forming a chamber for holding roughage feed, said bottom wall including an arcuate longitudinal trough section canted about a longitudinal axis, and first and second upwardly and outwardly inclined sections extending from opposite sides of the trough section, said first and second inclined sections merging at their upper ends respectively into said upper side walls, an auger located in the chamber adjacent to said trough section, said auger having a longitudinally extending shaft between said end walls and helical flight means secured to said shaft, said helical flight means having an outer edge, means rotatably horizontally mounting said shaft on said end walls for rotation about the longitudinal axis of said shaft, said trough section and said first inclined section of said bottom wall defining therebetween a longitudinal break line extended continuously between said end walls, said break line being located in a horizontal plane intersecting the longitudinal axis of the shaft and in close adjacent relationship with the outer edge of said helical flight means, said canted trough section located in close adjacent relationship with the outer edge of said helical flight means and extending from said break line through an arc on the order of 135 degrees to merge with said second inclined section, said outer edge of the helical flight means being uniformly spaced inwardly from the break line along the horizontal plane intersecting the longitudinal axis of the shaft, said trough section being spaced radially outward a small and uniform distance from the outer edge of the helical flight means whereby roughage feed does not wedge between the helical flight means and the break line and helical flight means and the trough section, said second inclined section extending generally tangentially from said trough section at a location below said horizontal plane of the auger shaft axis, means to rotate said auger in a direction so that a first lateral portion of the auger moves downwardly past said break line toward said trough section and a second lateral portion thereof opposite the first lateral portion moves upwardly away from said trough section and from said second inclined section, and a discharge opening through said tangential second inclined section through which feed is discharged by the rotating auger.

2. The apparatus of claim 1 wherein: said helical flight means includes a first helical flight and a second helical flight, each of said helical flights having an outer edge movable adjacent said break line.

3. The apparatus of claim 2 wherein: said first helical flight has a twist opposite the twist of the second helical flight.

* * * * *